(12) United States Patent
Chang et al.

(10) Patent No.: US 11,263,192 B2
(45) Date of Patent: Mar. 1, 2022

(54) HYPER-FOLDING INFORMATION IN A UNIFORM INTERACTION FEED

(71) Applicant: International Business Machines Corporation, Armonk, NY (US)

(72) Inventors: Chiwen Chang, Taipei (TW); Hsiang Chang, New Taipei (TW); Ming Jyh Hsieh, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/686,280

(22) Filed: Nov. 18, 2019

(65) Prior Publication Data

US 2021/0149864 A1  May 20, 2021

(51) Int. Cl.
*G06F 16/22* (2019.01)
*G06F 16/2455* (2019.01)
*G06F 16/28* (2019.01)

(52) U.S. Cl.
CPC ...... *G06F 16/2272* (2019.01); *G06F 16/2246* (2019.01); *G06F 16/2456* (2019.01); *G06F 16/24566* (2019.01); *G06F 16/288* (2019.01)

(58) Field of Classification Search
CPC .......................... G06F 16/2272; G06F 16/2246
See application file for complete search history.

(56) References Cited

U.S. PATENT DOCUMENTS

| | | | | |
|---|---|---|---|---|
| 8,300,951 B1* | 10/2012 | Mech | ................. | G06K 9/48 382/203 |
| 8,489,644 B2* | 7/2013 | Tanzy | ................. | G06F 16/958 707/797 |
| 10,169,378 B2 | 1/2019 | Sassin | | |
| 2007/0265863 A1* | 11/2007 | Tien | ................. | G06Q 30/00 715/825 |
| 2009/0254574 A1* | 10/2009 | De | ................. | G06F 16/367 |
| 2010/0145715 A1* | 6/2010 | Cohen | ................. | G06Q 10/067 705/1.1 |
| 2010/0318506 A1* | 12/2010 | Ditto | ................. | G06F 16/901 707/706 |
| 2011/0249002 A1* | 10/2011 | Duplessis | ............. | G06F 3/0482 345/440 |
| 2014/0075004 A1* | 3/2014 | Van Dusen | ............. | H04L 41/04 709/223 |

(Continued)

OTHER PUBLICATIONS

Phillips-Wren et al., "Business Analytics in the Context of Big Data: A Roadmap for Research", Communications of the Association for Information Systems, vol. 37 Article 23, Aug. 2015, DOI: 10.17705/1CAIS.03723, Copyright © 2015 by the Association for Information Systems, 26 pages.

*Primary Examiner* — Eliyah S. Harper
(74) *Attorney, Agent, or Firm* — Jordan A. Lewis; Randy E. Tejeda

(57) ABSTRACT

Embodiments of the present invention provide a computer system, a computer program product, and a method that comprises generating a context data tree for each variable in a plurality of variables based on a received input; determining data folding points for each generated context data tree; conducting a hyper-folding process on the determined data folding points in each context data tree, wherein the hyper-folding process converts each generated context data tree into a single data tree; and automatically loading the single data tree into an application.

20 Claims, 7 Drawing Sheets

(56) References Cited

U.S. PATENT DOCUMENTS

2015/0106748 A1* 4/2015 Monte ................ G06F 3/04883
              715/753
2018/0095952 A1   4/2018 Rehal
2019/0196890 A1* 6/2019 Bucchi .............. G06F 16/24545

* cited by examiner

|   | B | C | D |
|---|---|---|---|
| 1 | column_name | sub_field_name | data_type |
| 2 | event_id | | string |
| 3 | event_type | | string |
| 4 | event_detail | | array<map<string,string>> |
| 5 | | change_category_detail | string |
| 6 | | change_detail | string |
| 7 | | loan_detail | string |
| 8 | | investment_detail | string |
| 9 | | call_detail | string |
| 10 | | travel_claim_detail | string |
| 11 | | claim_detail | string |
| 12 | event_date | | map<string,date> |
| 25 | event_original_id | | map<string,string> |
| 26 | | change_apply_id | string |
| 27 | | claim_apply_id | string |
| 28 | | new_contract_apply_id | string |
| 29 | | contract_id | string |
| 30 | | policy_id | string |
| 31 | | callin_id | string |
| 32 | | group_claim_seq | string |
| 33 | | business_trip_id | string |
| 34 | policy_info | | array<struct<>> |
| 141 | category_info | | array<struct<>> |
| 204 | policy_change_info | | struct<> |
| 205 | | | |
| 206 | | policy_id | string |
| 207 | | remark | string |
| 208 | | identity_code | string |
| 209 | | change_process_status | string |
| 210 | | change_closing_code | string |
| 211 | | form_apply_date | date |
| 212 | | change_amount_detail | map<string,double> |
| 227 | | category_change_amount_detail | array<struct<>> |
| 243 | | investment_innout_detail | array<struct<>> |
| 253 | investment_info | | array<struct<>> |
| 254 | | system_id | string |
| 255 | | policy_id | string |
| 256 | | insured_seq | string |
| 257 | | coverage_seq | string |
| 258 | | investment_id | string |
| 259 | | is_auto_added | boolean |
| 260 | | invest_type | boolean |
| 261 | | addon_premium | int |

Annotations: 502 → array<map<string, string>>; 504 → map; 506 → struct; also array<struct> near row 258.

FIG. 5

| | |
|---|---|
| { | |
| "client_id": "A111111111", | String |
| "age": 53, | Int |
| "client_name": "Tony", | String |
| "home_contact_info": {"home_addr": "address1", "office_addr": "address2"}, | Map<String, String> |
| "policy_contact_info": [ {"policy_no": "aaa", "contact_phone": "phonenumber"}, {"policy_no": "aaa", "contact_mobile": "mobilenumber"} ], | Array<Map<String,String>> |
| "agent_info": {agent_id": "AAA", "duty_degree": "Lv1"}, | Struct |
| "policy_list": [ {"policy_no": "aaa", "start_date": "20190101"}, {"policy_no": "bbb", "start_date": "20190103"}, {"policy_no": "ccc", "start_date": "20190105"} ] | Array<Struct> |
| } | |

HYPER-FOLDING INFORMATION IN A UNIFORM INTERACTION FEED

FIELD OF INVENTION

The present invention relates generally to the field of data capture, and more specifically to event analytical data structures.

BACKGROUND

In data science, data signals or user events are captured to discover user intentions and patterns from complex business logics and user behaviors. Data capture is the process of extracting information from a document and converting it into data readable by a computer. Generally, data capture can refer to collecting relevant information whether sourced from paper or electronic documents.

There are multiple methods of data capture available such as bar code recognition, intelligent document recognition, entity relational data systems, and event analytical data structures. The most common of these methods that is generally used in complex data capture is entity relational model-based data systems, while event analytical data structures are less common.

Generally, conventional entity relational ("ER") model-based data systems keep the relations of entities in numerous tables. ER is a high-level conceptional data model diagram. An ER model is based on the notion of real-world entities and the relationship between them. Generally, ER modeling helps one to analyze data requirements systematically to produce a well-designed database.

SUMMARY

Embodiments of the present invention provide a computer system, a computer program product, and a method that comprises generating a context data tree for each variable in a plurality of variables based on a received input; determining data folding points for each generated context data tree; conducting a hyper-folding process on the determined data folding points in each context data tree, wherein the hyper-folding process converts each generated context data tree into a single data tree; and automatically loading the single data tree into an application.

BRIEF DESCRIPTION OF THE DRAWINGS

FIG. 5 is an example of a code fragment for a program with the ability to generate multiple context data trees, in accordance with an embodiment of the present invention;

FIG. 7 is an example of a code fragment for a program with the ability to automatically load a generated context data tree into an application, in accordance with an embodiment of the present invention.

DETAILED DESCRIPTION

Embodiments of the present invention recognize that ER model-based data systems keep relations of entities in tables or trees. Often times the information stored on the tables or trees require a corresponding amount of memory to store the information (e.g., it requires a large amount of data joins). In other words, embodiments of the present invention recognize that a large amount of memory is required to obtain a context for a simple event to be captured by the data tables or trees. Embodiments of the present invention further recognize that using denormalized systems would be an inefficient solution because these systems still require a significant amount of data tables or trees to keep track of the context with different events. Generally, data science systems used to capture data signals to discover user intents require hundreds of data tables and a large amount of data joins to encapsulate a simple event. For example, a data science system would have to create multiple trees with hundreds of data joins to discover the interests of music festival attendees, which would require separate data trees for multiple variables such as a data tree for each artist, each stage, each attendee, a data tree capable of interpreting all of those joins, and generating a data join encapsulating all of that discovery via a user interface. Embodiments of the present invention recognize the need for ways to provide a data capture structure that would allow for single data table without complex joins, which would free memory space in a computing environment and allow a data set to be searched faster. ER requires a large amount of data joins in order to generate a database that encompasses all of the context of a simple event. This would require ER to use denormalized systems due to the numerous data tables that required to keep track of context of different events, which is infeasible. Embodiments of the present invention provide a method of using an event analytical data structure encapsulated within a hyper-folding process that would support prompt and agile marketing and analytics by allowing data scientists to work on a single data structure for pattern discovery rather than analyzing multiple data relations and hundreds of different join logics. Embodiments of the present invention provide systems, methods, and computer program products for improving data capture technology to encapsulate context of a user event in a single record in at least one data table.

Figure 1:
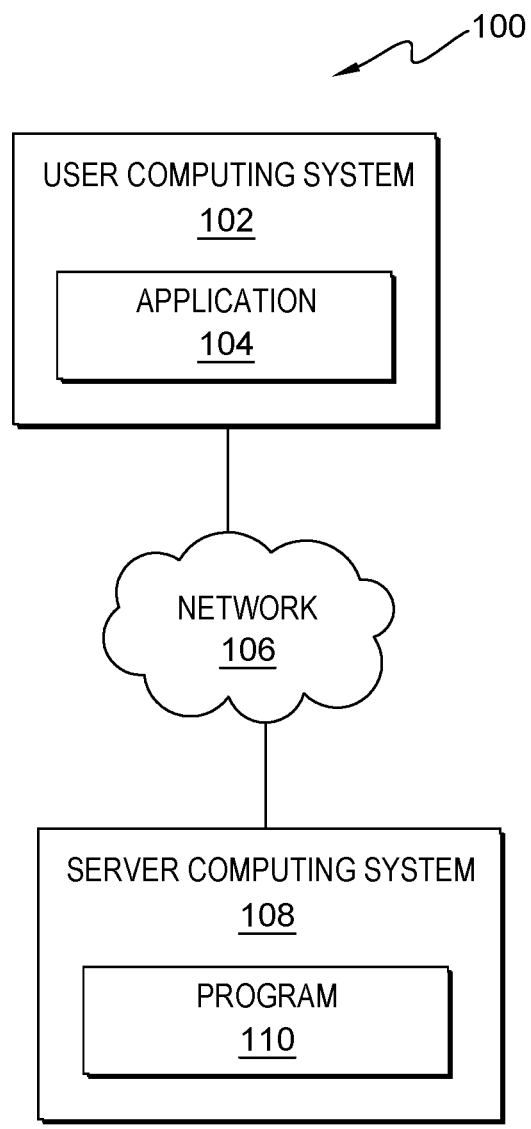
FIG. 1 is a functional block diagram depicting an environment with a computing device connected to or in communication with another computing device in accordance with at least one embodiment of the present invention.

FIG. 1 is a functional block diagram depicting a computing environment 100 in accordance with an embodiment of the present invention. The computing environment 100 includes an application 104 on a user computing system or device 102 connected to a server computing device 108 via a network 106. A data folding program 110 operates on the server computing system or device 108. The user computing device 102 and the server computing device 108 may be desktop computers, laptop computers, specialized computer servers, or any other computing device known in the art. In an embodiment, the user computing device 102 and the server computing device 108 may represent computer systems utilizing multiple computing devices or components to act as a single pool of seamless resources when accessed through a network 106. Generally, the user computing device 102 and the server computing device 108 may be representative of any electronic devices, or a combination of electronic devices, capable of executing machine-readable program instructions, as desired in greater detail with regard to FIG. 9.

In another embodiment, the user computing device 102 may include an application 104 and a data folding program 110. In this embodiment, the application 104 may be installed on the user computing device 102. In general, the application 104 includes a user interface capable of displaying a generated hyper-folded data tree, stores the generated hyper-folded data tree, stores a query ran on the generated hyper-folded data tree, and communicates with the data folding program 110 on the server computing device 108 via the network 106. In another embodiment, the application 104 may be a data warehouse, such as Hadoop-Hive. In another embodiment, the application 104 may be implemented using a browser and web portal or any other application that transmits search queries to, and receives results from, the server computing device 108. For example, the application 104 navigates context data of an event encapsulated by a hyper-folding process, which encodes multiple data trees and data joins in order to compile a context of a user event.

A network 106 can be a local area network ("LAN"), a wide area network ("WAN") such as the interne, or a combination of the two; and it may include wired, wireless or fiber optic connections. Generally, the network 106 can be any combination of connections and protocols that will support communication between the user computing device 102 and the server computing device 108, specifically the data folding program 110 in accordance with a desired embodiment of the invention.

A server computing device 108 includes a data folding program 110 that hyper-folds data trees into a single data tree. In this embodiment, the data folding program 110 receives, encodes, encapsulates, combines, and maintains data in a complex data tree or type. In at least one embodiment, the data folding program 110 on the server computing device 108 gathers any transmitted data received by the user computing device 102, encodes a multi-field data record and a one-to-many multi-field data set to a single value of complex data cell, and generates a single data tree or record to encapsulate context data of a user event. For example, the data folding program 110 on the server computing device 108 will gather context data for a user event, such as a concert, and encode that data into multiple data trees for each value (e.g., an attendee's name, attendee's address, attendee's ticket price, attendee's seat location, attendee's age, and any other valuable data that can be perceived from the user event). Then the data folding program 110 will generate a single data tree that encapsulates the multiple data trees in order to boost the efficiency, speed, and amount of space of a search.

In another embodiment, the data folding program 110 recursively applies a hyper-folding process in a specific order to encode hundreds of data trees in an ER data model into a single data tree. Recursively applying a hyper-folding process transforms an event's data context into a tree structure. In another embodiment, the data folding program 110 encodes a single data tree from a parent or leaf node of the data tree structure; and the parent or leaf node may be defined as a data join, which is represented as a traversal route from a leaf node to a root node. In another embodiment, the data folding program 110 applies a hyper-folding process that encodes all data joins and encapsulates a cardinality in non-leaf nodes. Cardinality is defined as a measure of the number of elements in a data set. In another embodiment, the data folding program 110 folds all non-root nodes onto a parent node and encapsulates any and all information to the root node.

Figure 2:
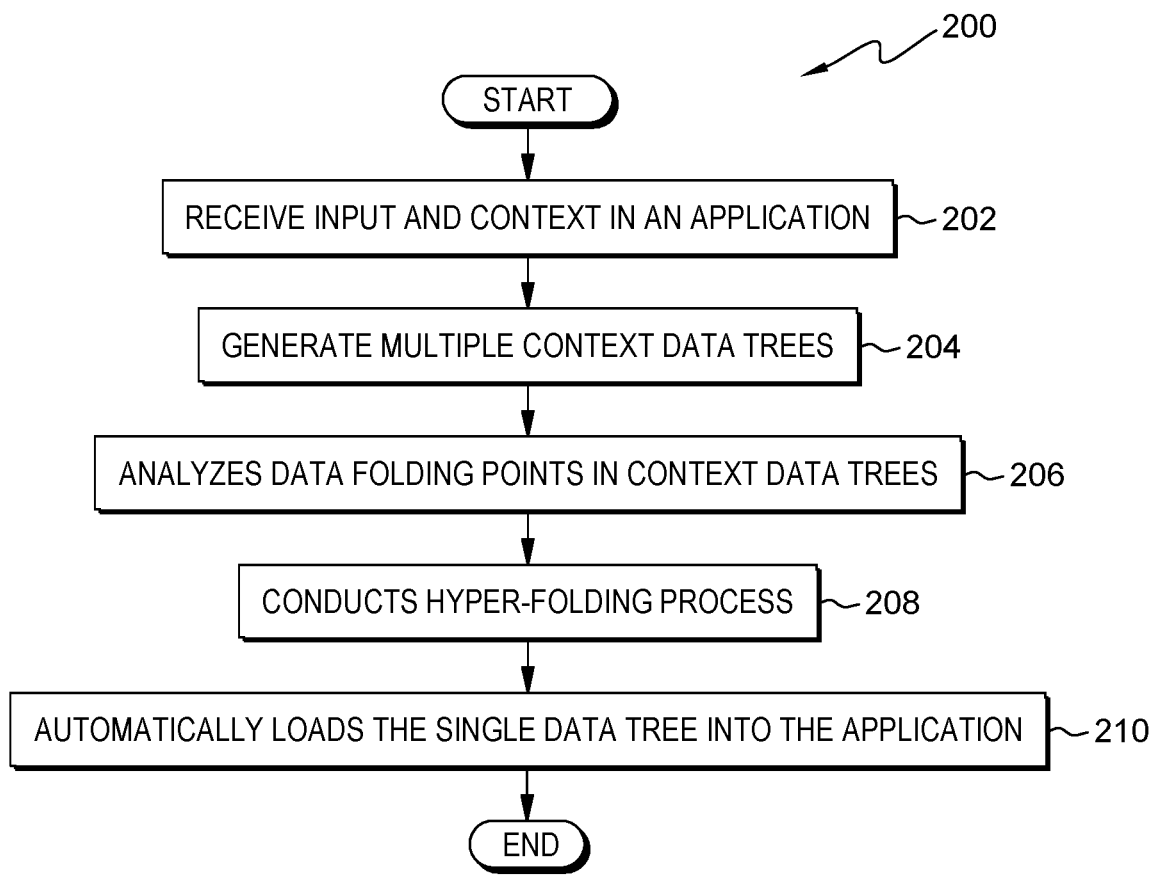
FIG. 2 is a flowchart illustrating operational steps of a method to hyper-fold data sets, in accordance with an embodiment of the present invention.

FIG. 2 is a flowchart 200 illustrating operational step for a hyper-folding information in a data set, in accordance with an embodiment of the present invention.

In step 202, a data folding program 110 receives input and context from an application 104 on a user computing device 102. In this embodiment, the input includes information regarding a user event and a user such as the user's address, the user's policy number, the user's name, the user's phone number, the user's age, the user's preferences, and any other information that can be used to advertise a product to a user. For example, a user event may be a fundraiser, and the input received may be a donor's name, the donor's pledge, the donor's address, the donor's age, the donor's political affiliation, and any other information that a fundraiser would want recorded for each donor. In an embodiment, the data folding program 110 extracts context data from the received input using a combination of natural language processing and machine learning techniques. In an embodiment, the data folding program 110 may obtain user consent via an opt-in and opt-out feature. In an embodiment, the data folding program 110 may transmit a notification to a user each time data is collected.

In step 204, the data folding program 110 generates multiple context data trees. In this embodiment, the data folding program 110 will generate multiple context data trees by generating a context data tree for each input items that will be recorded for the user event. For example, the data folding program 110 will generate a context data tree for each genus and another context data tree for each species groupings. In another embodiment, the data folding program 110 will generate a context data tree for similar context trees, where similar is defined as a context data tree that is within a certain percentage of matching features or matching characteristics of the same context data tree. In another embodiment, the data folding program 110 will generate a context data tree for each variable that was raised in the fundraiser example and construct a data tree for any other variables that would assist the recordation of the user event. More examples of the data folding program 110 will be discussed in greater detail with respect to subsequent figures.

In step 206, the data folding program 110 determines data folding points in each context data tree for a user event. In this embodiment, the data folding program 110 determines each context data tree by identifying and deriving data join routes, data folding keys, and data roll-up join keys to identify points to hyper-fold each multiple context data trees into a single context data tree for a user event. Data folding points are defined as a feature that allows a user to selectively fold sections of a file as a part of routine edit operations, which also allows a user to manage large amounts of data while viewing only those portions of data that are specifically relevant at any given time. A fold is defined as an operation that has the potential to expand data fields or compress data fields. Data join routes are defined as a figurative route or path to create multiple data trees from a single data tree or a single tree to multiple trees. Data folding keys refer to a family of high-order functions that analyze a recursive data structure and through a given combining operation, recombine the results of recursively processing the data structure's constituent parts. In an embodiment, data folding keys may refer to a top node of a data tree presented with combining function, and possibly some default vales to be used under certain conditions. Data roll-up join keys are defined as a way to gather information from multiple levels of child data specifications and roll those levels into a table or tree in a parent specification. In an embodiment, automatic linking to specific specification properties is achieved by creating columns in a data roll-up join key that match the name of specific specification properties in the child data specifications. For example, the data folding program 110 will analyze and derive the key folding points in multiple data trees formed from the multiple variables of the fundraiser user event and subject those multiple trees to derivations of data join routes, data folding keys, and data roll-up join keys in order to condense the multiple data trees into a single data tree. This step will be further illustrated in FIG. 3.

In step 208, the data folding program 110 conducts a hyper-folding process. In this embodiment, the data folding program 110 encapsulates context data of a user event in a single record in a single data tree and encodes multiple data trees into a single value of a complex data tree. In another embodiment, the data folding program 110 recursively applies a hyper-folding process in a specific order to form a single data set encoded from hundreds of data trees in an ER data model. In another embodiment, the hyper-folding process recursively transforms context data of a user event into a data tree structure, which requires each relationship between data joins and data trees to be encoded to the parent or leaf nodes within the data tree structure. For example, the data folding program 110 conducts the hyper-folding process to the multiple data trees from each variable of the fundraiser user event of step 206, which will fold the multiple data trees into a single data tree with context data of each multiple trees of the user even. A hyper-fold compresses or folds multiple complex data trees into a single data tree.

In step 210, the data folding program 110 automatically loads the single data tree into the application 104. In this embodiment, the data folding program 110 loads the single data tree by transferring the generated single data tree after each multiple data tree undergoes the hyper-folding process. In another embodiment, the data folding program 110 may transmit a copy of the generated single data tree to the application 104 and save the generated single tree locally on the server computing device 108. In another embodiment, the application 104 may be an application named Interaction Feed. For example, the data folding program 110 will generate the single data tree on the fundraiser user event, and automatically upload the single data tree in a interaction feed system so that a user may see the results of the hyper-folding process, run a query on the data tree, and implement changes that effect the user event based off of the results and the query of the single data tree. In another embodiment, the data folding program 110 maintains the generate single data tree on the server computing device 108.

Figure 3:
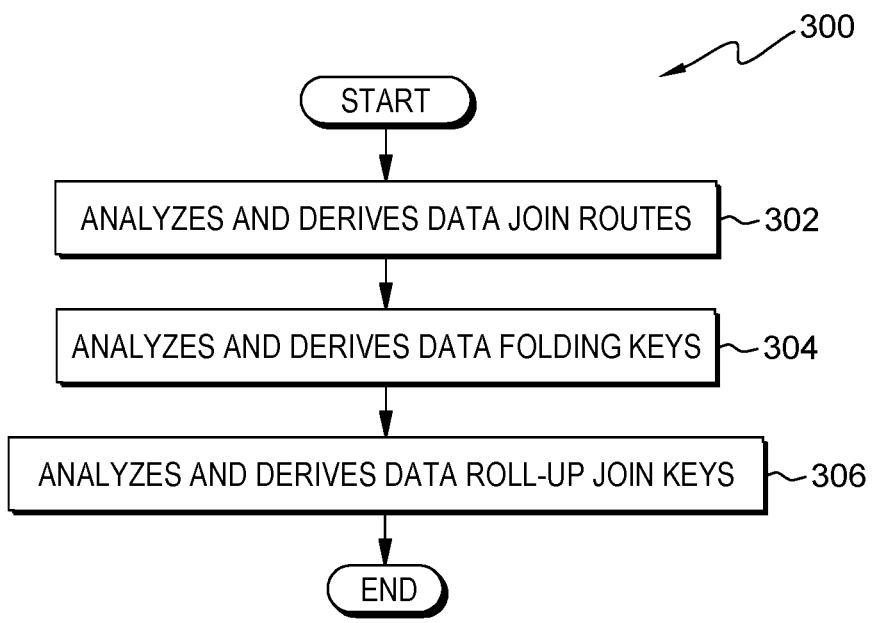
FIG. 3 is a flowchart illustrating the operational step of analyzing data folding points in context data trees for a user event, in accordance with an embodiment of the present invention.

FIG. 3 is a flowchart 300 illustrating the operational step of analyzing data folding points in context data trees for a user event.

At step 302, the data folding program 110 analyzes and derives data join routes by construing each existing data tree, identifying data join routes, and creating a single data tree from those data join routes. In this embodiment, the data folding program 110 may create a single data tree from multiple data trees after the data folding program 110 parses through each existing data tree and identifies points of intersection between those existing data trees. For example, the data folding program 110 will parse through each existing data tree, determine that branch 3 of tree A and branch 3 of tree B are a point of intersection, and identify this as a data join route.

At step 304, the data folding program 110 analyzes and derives data folding keys by construing each existing data tree, identifying data folding keys, and recursively processing constituent parts of multiple data trees into a single data tree. In this embodiment, the data folding program 110 recombines the results of recursively processing constituent parts of multiple data trees into a single data tree after the data folding program 110 parses through each existing data tree and identifies data folding keys between those existing data trees. For example, the data folding program 110 will parse through each existing data tree, determine that branch 3 of tree A and branch 3 of tree B are points of data folding, and identify this as a data folding key.

At step 306, the data folding program 110 analyzes and derives data roll-up join keys by construing each existing data tree, identifying data roll-up join keys, gathering information from multiple levels of data trees, and rolling those levels into a single data tree. In this embodiment, the data folding program 110 gathers information from multiple levels of child data specifications or tress and rolls those levels into a single table or tree in a parent specification after the data folding program 110 parses through each existing data tree and identifies data roll-up join keys between those existing data trees. For example, the data folding program 110 will parse through each existing data tree, determine that branch 3 of tree A and branch 3 of tree B are points of data rolling, and identify this as a data roll-up join key. In another embodiment, the data folding program 110 analyzes data folding points in order to increase memory in the application 104 on the user computing device 102. In another embodiment, the data folding program 110 analyzes data folding points in order to increase the speed of a query of a context data tree.

Figure 4:
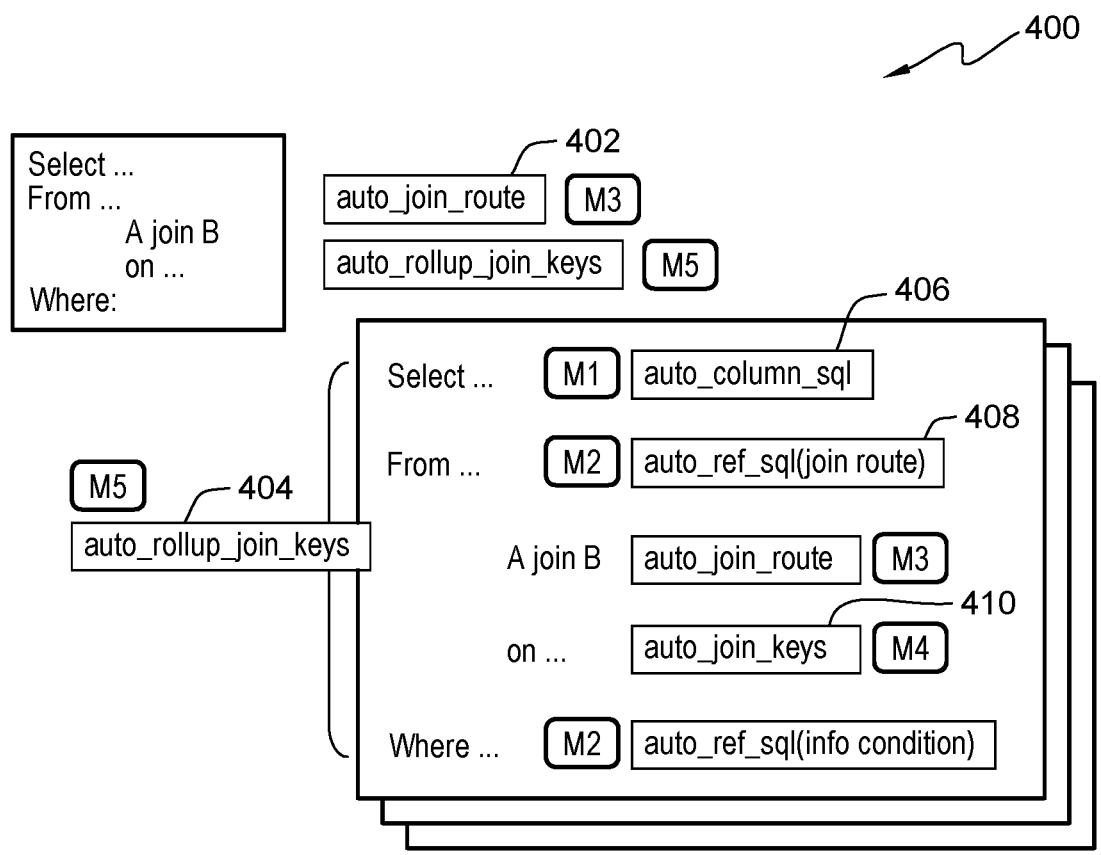
FIG. 4 is an example of a code fragment for a program with the ability to analyze data folding points in context data trees for a user event, in accordance with an embodiment of the present invention.

FIG. 4 is an example of a code fragment 400 as displayed on a user interface comprising input field boxes that contain selectable commands to perform, determine, and identify data folding points, in accordance with an embodiment of the present invention.

In this present embodiment, the data folding program 110 automatically analyzes and derives these data folding points as context data trees for a user event. In this embodiment, the data folding program 110 maintains an automatic join route 402 and an automatic roll-up join key 404, which are defined as input field boxes that contain selectable commands to perform specific features. These features are analyzed and derived by the data folding program 110 as potential data folding keys.

In this present embodiment, the data folding program 110 may automatically select the automatic roll-up join key 404, which will allow the data folding program 110 to select an automatic column SQL 406 from an automatic reference SQL 408. These are also input field boxes that contain selectable commands to perform specific features. SQL is a domain-specific language used in programming and designed for managing data held in a rational database management system or for stream processing in a relational data stream management system. The automatic column SQL 406 allows the data folding program 110 to automatically add an additional column to the previously generated data tree. The automatic reference SQL 408 serves as a reference database for the data folding program 110. In another embodiment, the data folding program 110 may require the use of a persisted computed value to incur the cost of computing a value each time the data folding program access the automatic column SQL 406.

In another embodiment, the data folding program 110 may select the automatic join route 402 on an automatic join keys 410, which will allow the data folding program 110 to automatically merge a data tree with another data tree on the automatic data join keys feature 410.

FIG. 5 is an example of a code fragment 500 for a program with the ability of generating multiple context data trees, in accordance with an embodiment of the present invention. This example illustrates the data folding program 110 generating multiple context data trees for each variable that may be queried in a recordation of a user event. In this embodiment, the data folding program 110 generates a context data tree comprising a data tree for each variable to be sorted. For example, the data folding program 110 will generate a separate data tree for event type, event detail, event type, event date, event original ID, event policy information, event category information, event policy change information, and event investment information. In this example, the data folding program 110 lists nine categories, comprises elements of each category in a sub-field, and associates each element with a data type. In this example, the nine categories that the data folding program 110 comprises are event ID, event type, event detail, event date, event original ID, policy information, category information, policy change ID, and investment information. In this example, the data folding program 110 comprises multiple elements of each category in a sub-field such as change detail, loan detail, and investment detail, and the data folding program 110 comprises multiple data types such as array, map, and struct.

In this embodiment, the data folding program 110 may contain an array data type 502. The array data type 502 is a collection of elements of the same data type and is a specialized format for organizing and storing data. For example, the array data type 502 comprises category details, loan details, change details, investment details, call details, travel claim details, and claim details. In this embodiment, the data folding program 110 may contain a map data type 504. The map data type 504 is an abstract data type composed of a collection of pairs, such that each possible data key appears at most once in the collection. In this embodiment, the data folding program 110 may contain a struct data type 506. For example, the map data type 504 comprises change apply ID, claim apply ID, new contract apply ID, contract ID, policy ID, call-in ID, group claim ID, and business trip ID. The struct data type 506 is a composite data type declaration that defines a physically grouped list of variables under one name in a block of memory, allowing the different variables to be accessed via a single pointer or by the struct data type 506 declared name that returns the same address. For example, the struct data type 506 comprises policy ID, remarks, identity codes, change process status, change closing code, formal apply date, change amount details, category change amount details, and investment amount details. In another embodiment, the struct data type 506 may contain other data types for a mixed-data-type records. For example, the data folding program 110 will generate an array data type 502 context data tree, a map data type 504 context data tree, a struct data type 506 context data tree, and a mixed-data-type record containing an array data type 502 mixed with a struct data type 506 to form a mixed-data-type context data tree.

Figure 6:
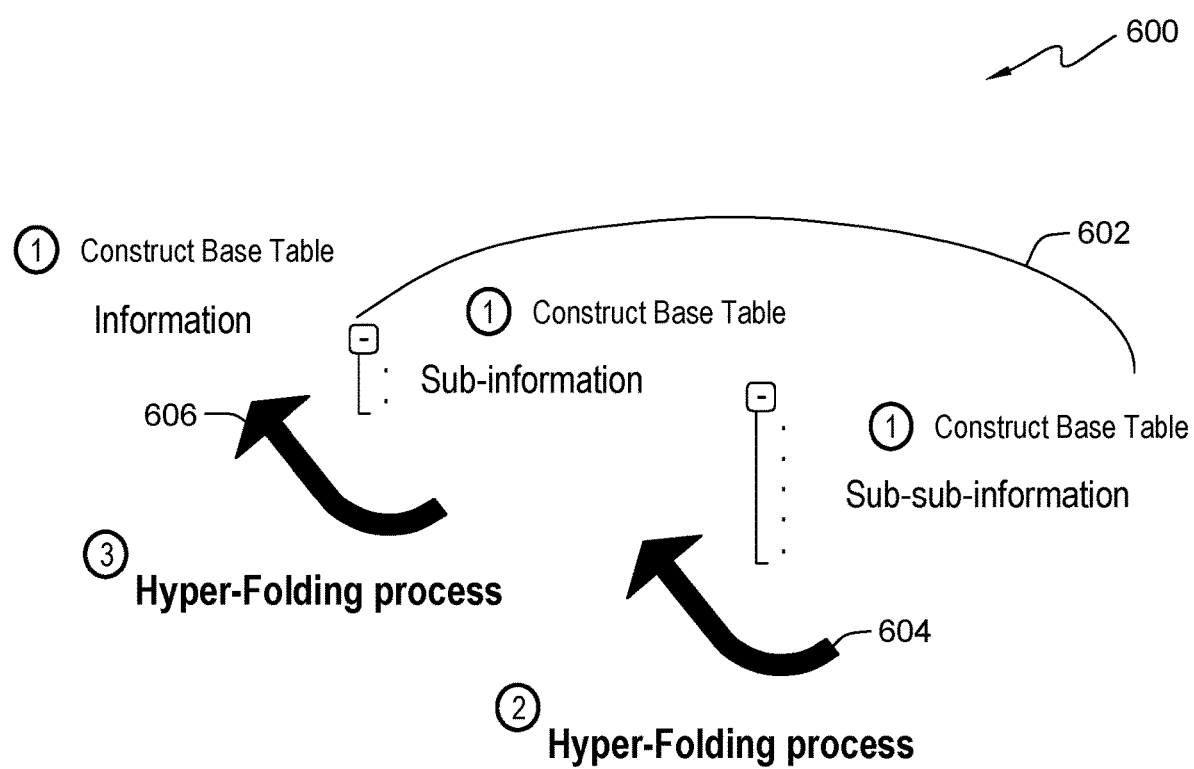
FIG. 6 is a flowchart illustrating the operational step of hyper-folding data in a program, in accordance with an embodiment of the present invention.

FIG. 6 is a diagram 600 of a process illustrating the operational step of hyper-folding data in a program, in accordance with an embodiment of the present invention. For example, this diagram 600 comprises three elements pertaining to a specific user event. In this example, the broadest category of information comprises animals, the sub-information comprises mammals, and the sub-sub-information comprises mammals located in North America. In this embodiment, the data folding program 110 generates multiple context data trees, and those context data trees are hyper-folded until a single context data tree remains. At step 602, the data folding program generates context data trees containing information, sub-information, and sub-sub-information. In this embodiment, sub-information and sub-sub-information data trees may be constructed of different data types. At step 604, the data folding program 110 hyper-folds sub-sub-information data trees into sub-formation data trees, leaving only information trees and sub-information data trees. At step 606, the data folding program 110 hyper-folds sub-information data trees into information trees, leaving only information data trees. In another embodiment, the data folding program 110 may form only one information data tree, thus generating a single context data tree.

FIG. 7 is an example of a code fragment 700 for a program with the ability to automatically load a generated context data tree into an application, in accordance with an embodiment of the present invention. In this embodiment, the data folding program 110 encodes multiple data trees into a single context data tree and encapsulates the multiple context data trees into a single context data tree. Then, the data folding program 110 automatically loads the single context data tree into an application 104 capable of storing and querying the single context data tree. In this embodiment, the application 104 may be a Hadoop-Hive system, which allows for improved memory on the user computing devices 102, faster data folding program 110 processing, and improved searching of the single context data tree. In another embodiment, the data folding program 110 may maintain the single context data tree on the server computing device 108. For example, the data folding program 110 comprises single data tree after a hyper-folding process has been ran on each data tree, which resulted in a string data type that lists a particular client ID as A11111111 and a particular client name of Tony. In this example, the data folding program 110 comprises a map data type and an array data type to expand on the initial string data type information, and this includes home contact information and policy contact information. In this example, the data folding program 110 comprises a struct data type and an array data type to expand on the previous information, and this includes agent information and a policy list.

Figure 8:
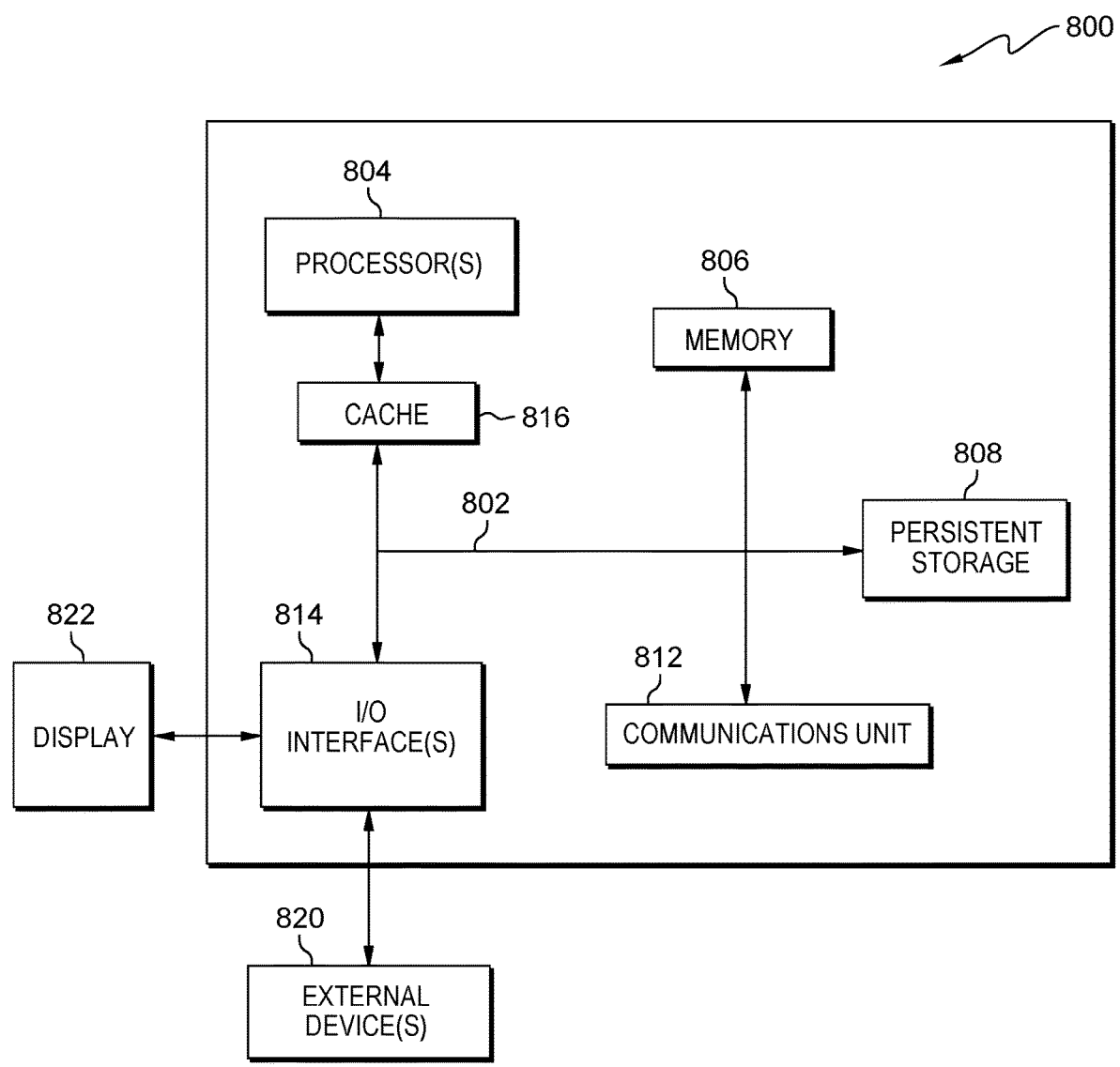
FIG. 8 is a block diagram of internal and external components of the computer systems of FIG. 1, in accordance with an embodiment of the present invention.

FIG. 8 depicts a block diagram of components of computing systems within a computer environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 800 includes a communications fabric 802, which provides communications between a cache 816, a memory 806, a persistent storage 808, a communications unit 810, and an input/output (I/O) interface(s) 812. The communications fabric 802 can be implemented with any architecture designed for passing data and/or control information between processors (such as microprocessors, communications and network processors, etc.), system memory, peripheral devices, and any other hardware components within a system. For example, the communications fabric 802 can be implemented with one or more buses or a crossbar switch.

The memory 806 and the persistent storage 808 are computer readable storage media. In this embodiment, the memory 806 includes random access memory (RAM). In general, the memory 806 can include any suitable volatile or non-volatile computer readable storage media. The cache 816 is a fast memory that enhances the performance of the computer processor(s) 804 by holding recently accessed data, and data near accessed data, from the memory 806.

The data folding program 110 may be stored in the persistent storage 808 and in the memory 806 for execution by one or more of the respective computer processors 804 via the cache 816. In an embodiment, the persistent storage 808 includes a magnetic hard disk drive. Alternatively, or in addition to a magnetic hard disk drive, the persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 808 may also be removable. For example, a removable hard drive may be used for the persistent storage 808. Other examples include optical and magnetic disks, thumb drives, and smart cards that are inserted into a drive for transfer onto another computer readable storage medium that is also part of the persistent storage 808.

The communications unit 810, in these examples, provides for communications with other data processing systems or devices. In these examples, the communications unit 810 includes one or more network interface cards. The communications unit 810 may provide communications through the use of either or both physical and wireless communications links. The data folding program 110 may be downloaded to the persistent storage 808 through the communications unit 810.

The I/O interface(s) 812 allows for input and output of data with other devices that may be connected to a mobile device, an approval device, and/or the server computing device 108. For example, the I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., the data folding program 110, can be stored on such portable computer readable storage media and can be loaded onto the persistent storage 808 via the I/O interface(s) 812. The I/O interface(s) 812 also connect to a display 820.

The display 820 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   generating a context data tree for each variable in a plurality of variables based on a received input;
   determining data folding points for each generated context data tree by identifying data roll-up keys in each generated context data tree, wherein the data folding points allow selective folding of sections of a file as a part of routine edit operations;
   conducting a hyper-folding process on the determined data folding points in each context data tree, wherein the hyper-folding process converts the generated context data trees into a single data tree; and
   automatically loading the single data tree into an application.

2. The computer-implemented method of claim 1, wherein each variable in the plurality of variables is a record including a user and a user event.

3. The computer-implemented method of claim 1, wherein determining data folding points for each generated context data tree further comprises:
   organizing identified data join routes, data folding keys, and data roll up keys in a sequential manner that represents each variable as a data folding point in the generated context data tree.

4. The computer-implemented method of claim 3, wherein organizing the identified data join routes, data folding keys, and data roll-up join keys in a sequential manner comprises construing the generated context data tree to generate a single data tree after identifying and determining data folding points.

5. The computer-implemented method of claim 1, wherein conducting a hyper-folding process on the determined data folding points in each context data tree comprises recursively processing the determined data folding points in each generated context data tree and gathering information from multiple levels of each generated context data tree.

6. The computer-implemented method of claim 1, wherein conducting a hyper-folding process comprises encapsulating each variable of a generated context data tree of a user event into a single record in a new, single data tree.

7. The computer-implemented method of claim 1, wherein conducting a hyper-folding process comprises encoding each generated context data tree into a single respective value of a complex data tree, which each generated context data tree is based on a respective variable of a user event.

8. The computer-implemented method of claim 1, wherein conducting a hyper-folding process comprises encoding multiple generated context data trees into a single value of a complex data tree, where the multiple generated context data trees are similar to each generated context data tree based on each variable of a user event.

9. The computer-implemented method of claim 1, wherein determining data folding points for each generated context data tree comprises selecting from at least one of data joining routes, data folding keys, and data roll up keys.

10. The computer-implemented method of claim 1, further comprising:
    automatically transmitting a copy of the generated single data tree to the application and saving the generated single tree locally on a server computing device.

11. A computer program product comprising:
one or more computer readable storage media and program instructions stored on the one or more computer readable storage media, the program instructions comprising:
program instructions to generate a context data tree for each variable in a plurality of variables based on a received input;
program instructions to determine data folding points for each generated context data tree by identifying data roll-up keys in each generated context data tree, wherein the data folding points allow selective folding of sections of a file as a part of routine edit operations;
program instructions to conduct a hyper-folding process on the determined data folding points in each context data tree, wherein the hyper-folding process converts the generated context data tree into a single data tree; and
program instructions to automatically load the single data tree into an application.

12. The computer program product of claim 11, wherein the program instructions to generate a context data tree comprises each variable in the plurality of variables is a record including a user and a user event.

13. The computer program product of claim 11, wherein the program instructions to determine data folding points for each generated context data tree further comprises:
program instructions to organize identified data joining routes, data folding keys, and data roll up keys in a sequential manner that represents each variable as a data folding point in the generated context data tree.

14. The computer program product of claim 13, wherein the program instructions to organize the identified data join routes, data folding keys, and data roll-up join keys in a sequential manner comprises construing the generated context data tree to generate a single data tree after identifying and determining data folding points.

15. The computer program product of claim 11, wherein the program instructions to conduct a hyper-folding process on the determined data folding points in each context data tree comprises program instructions to generate a single data tree from each generated context data tree by recursively processing identified data folding points in each generated context data tree and
gathering information from multiple levels of each generated context data tree in order to generate a single data tree.

16. The computer program product of claim 11, wherein the program instructions to determine data folding points for each generated context data tree comprises program instructions to select from at least one of data joining routes, data folding keys, and data roll up keys.

17. A computer system comprising:
one or more computer processors;
one or more computer readable storage media; and
program instructions stored on the one or more computer readable storage media for execution by at least one of the one or more processors, the program instructions comprising:
program instructions to generate a context data tree for each variable in a plurality of variables based on a received input;
program instructions to determine data folding points for each generated context data tree by identifying data roll-up keys in each generated context data tree, wherein the data folding points allow selective folding of sections of a file as a part of routine edit operations;
program instructions to conduct a hyper-folding process on the determined data folding points in each context data tree, wherein the hyper-folding process converts the generated context data tree into a single data tree; and
program instructions to automatically load the single data tree into an application.

18. The computer system of claim 17, wherein the program instructions to determine data folding points for each generated context data tree further comprises:
program instructions to organize identified data joining routes, data folding keys, and data roll up keys in a sequential manner that represents each variable as a data folding point in the generated context data tree.

19. The computer system of claim 17, wherein the program instructions to conduct a hyper-folding process on the determined data folding points in each context data tree comprises program instructions to generate a single data tree from each generated context data tree by recursively processing identified data folding points in each generated context data tree and gathering information from multiple levels of each generated context data tree in order to generate a single data tree.

20. The computer system of claim 17, wherein the program instructions to determine data folding points for the generated context data tree comprises program instructions to select from at least one of data joining routes, data folding keys, and data roll up keys.

* * * * *